UNITED STATES PATENT OFFICE 2,683,694

ANTIOXIDANT COMPOSITION

Alfred E. Hoffman, Clarendon Hills, Joseph A. Chenicek, Bensenville, and Harry E. Whitmore, Evanston, Ill., assignors to Universal Oil Products Company, Chicago, Ill., a corporation of Delaware No Drawing. Application August 16, 1950, Serial No. 179,881

8 Claims. (Cl. 252—404)

This application more particularly relates to an antioxidant composition in particle form and to the use thereof.

The use of an antioxidant for the purpose of retarding oxidative deterioration of organic substances is established practice. The use of an antioxidant in food products presents special requirements not encountered in the stabilization of other materials. For example, an antioxidant for use in food products must be non-toxic so that it will be officially approved for use, and also, to be of full value, should have carry-through properties so that baked goods will also be stabilized. In addition, the antioxidant must be soluble in the food products, and must not impart undesirable color, odor or taste thereto.

These problems become further complicated when the antioxidant comprises a mixture of two or more different components. The mixture offers advantages in some cases over the use of a single component because it may give a longer shelf life to an edible fat or oil, it may have a greater carry-through effect, or it may increase solubility of one or more of the components. The mixture may comprise a combination of one antioxidant which conveys a long shelf life together with another antioxidant which has carry-through properties and/or together with a compound known as a "synergist" which serves to further lengthen the shelf life of the edible fat and oil. Thus, with certain antioxidants, the use of a mixture of two or more components will be of advantage. However, the use of a mixture of two or more components, as hereinbefore set forth, presents further problems. For example, when one or more of the additional components is not readily soluble in the substrate, it has been necessary to utilize a solvent in order to form a homogeneous mixture which can be utilized satisfactorily. In many cases the solvent comprises a major proportion of the antioxidant composition, ranging as high as 70–80% of the mixture, and this in turn results in other objections. Firstly, it comprises the additional cost of the solvent and the handling thereof, including freight or other shipping charges entailed in transporting the antioxidant composition. Secondly, the choice of the solvent to be used is limited because it also must meet the requirements of non-toxicity and must not impart undesirable color, odor or taste to food products. The present invention offers a novel antioxidant composition which avoids the necessity of using a solvent and also offers the advantage of being in a form which is convenient for applying to the food products.

In one embodiment the present invention relates to solid particles of a mixture of butylated hydroxyanisole with propyl gallate and/or citric acid.

In a specific embodiment the present invention relates to a flaked mixture of from about 50 to about 90% by weight of butylated hydroxyanisole, from about 10 to about 25% of propyl gallate and from 10 to about 15% by weight of citric acid.

In another embodiment the present invention relates to a method of stabilizing an organic compound subject to oxidative deterioration which comprises adding thereto a flaked antioxidant composition as herein set forth.

The antioxidant composition of the present invention meets the requirements hereinbefore set forth and has been officially approved for use in food products. The use of an antioxidant is particularly desirable in edible fats and oils which may be of animal, marine, vegetable or mineral origin and include merely as typical representatives, linseed oil, soya oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats which are sold under various trade names. It is understood that other oils and fats may be treated within the scope of the present invention, including fats and oils which previously have been subjected to various treatments, such as blowing with air, heat treatment, etc.

Highly refined mineral oil, such as Nujol, etc., is utilized for human consumption and, therefore, may be treated advantageously in accordance with the novel features of the present invention. In addition, waxes such as paraffin waxes, vegetable waxes, etc. are utilized in the manufacture of coatings for containers for food products, and, because these waxes may undergo oxidative deterioration, it is advantageous to treat them with an antioxidant. Because of the possibility of the waxes contacting the food product, it is desirable that an officially approved antioxidant be utilized for this purpose. The antioxidant compositions of the present invention are particularly of advantage as compared to the use of a composition containing a solvent. For example, when an oily solvent is utilized, it will tend to sweat out in case it is not completely soluble in the wax or it will tend to lower the melting point of the wax in instances where it is completely soluble.

A particularly preferred antioxidant which not only extends the shelf life of fats and oils but also has the property of carrying through into the baked goods comprises a tertiary alkyl hydroxyanisole and particularly 3-tertiary butyl-4-hydroxyanisole in admixture with 2-tertiary butyl-4-hydroxyanisole, this composition being herein referred to as butylated hydroxyanisole. This composition is non-toxic and, therefore, has been officially approved for use in edible fats and oils.

While butylated hydroxyanisole is satisfactory for most uses, in some cases it is desirable to obtain an even longer shelf life, and the butylated hydroxyanisole is utilized in combination with an alkyl ester of gallic acid and particularly propyl gallate. This mixture conveys to lard a shelf life which is more than sufficient for practically all purposes and also serves to stabilize the baked goods. Butylated hydroxyanisole, not only is compatible with propyl gallate; that is, the mixture does not result in undesirable reaction products, but it appears that the mixture has a mutual synergistic effect in that the degree of stabilization is greater than the sum total of the effects obtained by each compound alone. Lard containing both butylated hydroxyanisole and propyl gallate may be stored for a long time without becoming rancid, and crackers, biscuits, potatoes, pastries, etc. made with the lard also may be stored for a long time without becoming rancid.

The use of the antioxidant composition of the present invention offers a further advantage over the use of a mixture of butylated hydroxyanisole and propyl gallate in a solvent. When in solution or when propyl gallate is utilized in amounts greater than one part by weight per five parts by weight of butylated hydroxyanisole in a solvent, the propyl gallate turns blue when it comes into contact with metals such as iron and, therefore, becomes undesirable for use in edible fats and oils. The use of the flaked mixture of the present invention will avoid this undesirable effect.

While 3-tertiary butyl-4-hydroxyanisole in admixture with 2-tertiary butyl-4-hydroxyanisole is the preferred antioxidant for use in accordance with the present invention, it is understood that other alkyl hydroxyanisoles may be employed but not necessarily with equivalent results. The other hydroxyanisoles include those in which the alkoxy group has a tertiary alkyl group having from 5 to about 12 carbon atoms. In some cases, the alkoxy group may comprise a larger group which generally will not contain more than five carbon atoms and includes such alkoxy groups as ethoxy, butoxy, propoxy and pentoxy radicals. Similarly, while propyl gallate is the preferred ester of gallic acid for use in connection with the present invention, it is understood that other alkyl esters thereof may be employed including the methyl, ethyl, butyl, amyl and hexyl esters of gallic acid, but not necessarily with equivalent results.

While the combination of butylated hydroxyanisole and propyl gallate will be satisfactory for practically all purposes, in some cases it may be desirable to obtain a lard having even a longer shelf life and, in such cases, a synergist such as citric acid, ascorbic acid, etc. and their esters may be used along with butylated hydroxyanisole and propyl gallate. The esters preferably are mono-esters and still more preferably the methyl, ethyl, propyl, butyl, amyl or hexyl ester.

In another embodiment of the invention the synergist may be utilized in combination with butylated hydroxyanisole, without propyl gallate, and this mixture will serve to convey a satisfactory shelf life to the lard and also to protect the baked goods made with the lard.

It is an essential feature of the present invention that the butylated hydroxyanisole in admixture with propyl gallate and/or citric acid is prepared in the form of solid particles and more particularly as flakes. The use of a flaked mixture avoids the necessity of using a solvent and thereby avoids the objections hereinbefore set forth. The flaked mixture is in a form which is very convenient for use. The flakes will flow readily and may be withdrawn simply by pouring them out of the container. This ease of handling of the antioxidant composition is advantageous as compared to the use of antioxidants which solidify in the container and, therefore, either have to be scraped out of the container or melted in order that the antioxidant will flow. As hereinbefore set forth, the advantages over the use of a solution are that the antioxidant composition is free from an unwanted solvent and also avoids the cost of handling and transporting the solvent.

The flaked mixture of the present invention may be prepared in any suitable manner. In one method, the butylated hydroxyanisole may be heated to its melting point or preferably slightly higher. This temperature range will generally be of from about 130° to about 160° F. Propyl gallate is soluble in the melted butylated hydroxyanisole and, when employed, propyl gallate powder may be dissolved in the liquid butylated hydroxyanisole. Preferably the mixture is stirred to produce a homogeneous mixture. Citric acid is only slightly soluble in liquid butylated hydroxyanisole and, when employed, citric acid powder may be partly dissolved and partly dispersed in the liquid butylated hydroxyanisole. Here again the mixture is stirred to produce a substantially homogeneous mixture. The liquid mixture of butylated hydroxyanisole and propyl gallate and/or citric acid is then supplied to a conventional flaking machine which generally comprises a revolving drum cooled on the inside by water or by other suitable means, whereby the antioxidant composition is chilled upon contacting and revolving on the drum, and the resultant cake is cut into flakes by a doctor blade positioned at the other end of the drum. The flakes are then collected in any suitable manner and packed into containers for shipment and use.

In some cases the flaking may be omitted and the chilled cake may be formed into powder or particles of uniform or irregular size and shape in any suitable manner. The resultant particles may then be utilized in place of the flakes.

In another embodiment of the invention, the mixture may be formed into powder or larger size particles, including spheres, by atomizing the liquid mixture through a nozzle or nozzles into a zone maintained at a temperature below the melting point of the mixture, whereby the liquid spray will solidify into discrete particles. In still another embodiment, the liquid mixture may be discharged onto a rotating disc and, by centrifugal force thereof, emitted in the form of droplets into the low temperature zone. The piping leading to the rotating disc and the disc itself may be heated by suitable means to prevent solidification of the mixture prior to discharge off the rotating disc. The low temperature zone may be cooled by any suitable means, including refrigerating coils, introduction of cooled inert gas, such as nitrogen, purified flue gas, etc. In some cases, a cooled body of water or other liquid in which the mixture is immiscible may be dispersed in the zone and the particles either will float on the top thereof or descend therethrough, depending on the density of the liquid employed. The liquid may be used as a means of withdrawing the particles from the chamber or zone and the particles may then be separated from the liquid by filtering, settling, etc. When using water or other liquid of higher density than the mixture, the liquid mixture may be atomized into the body of water and the particles will float to the top of the water layer and removed by decantation from the chamber. The zone preferably is maintained at a temperature below about 60° F., which generally will not be below about 35° F., in order to insure rapid solidification of the particles.

The concentrations of the components in the antioxidant composition may vary widely depending upon the particular substrate in which it is to be used. When the composition comprises a mixture of butylated hydroxyanisole and propyl gallate, the butylated hydroxyanisole may range from about 50% to about 90% by weight and the propyl gallate may range from about 10% to about 50% by weight of the composition and preferably the butylated hydroxyanisole ranges from about 75% to about 90% by weight and the propyl gallate ranges from about 10% to about 25% by weight of the composition. When the composition comprises a mixture of butylated hydroxyanisole and a synergist, such as citric acid or ascorbic acid, the mixture may comprise from about 50% to about 95% by weight of butylated hydroxyanisole and from about 5% to about 50% by weight of the synergist. When the composition comprises a mixture of butylated hydroxyanisole, propyl gallate and the synergist a preferred mixture comprises from about 50% to about 90% by weight of butylated hydroxyanisole, from about 5 to about 25% by weight of propyl gallate and from about 5% to about 25% by weight of citric acid, and preferably of from about 60% to about 80% by weight of butylated hydroxyanisole, from about 10% to about 25% by weight of propyl gallate and from about 10% to about 15% by weight of citric acid.

It has been found that when propyl gallate is used in lard in an amount greater than about 0.002% by weight and the lard is used for scrambling eggs, the eggs turned green. In order to avoid this discoloration, another preferred composition of butylated hydroxyanisole and propyl gallate comprises from about 80% to about 95% by weight of butylated hydroxyanisole and from about 5 to about 20% by weight of propyl gallate. When this composition is used with citric acid, a preferred mixture comprises from about 60% to about 80% by weight of butylated hydroxyanisole, from about 10% to about 20% by weight of propyl gallate and from about 10% to about 30% by weight of citric acid.

The proportion of citric acid in the antioxidant composition is generally not critical and, while in most cases it will comprise less than 25% by weight of the mixture, in some cases it may comprise up to 50% or more of the mixture. Thus, an antioxidant composition may comprise from about 25% to about 45% butylated hydroxyanisole, from about 5% to about 25% propyl gallate and from about 35% to about 70% citric acid.

Another advantage to the flaked antioxidant composition of the present invention is that it may be stored at temperatures up to approximately 100° F. without softening or fusing of the flakes. This avoids the necessity of refrigerating the antioxidant composition during storage. However, it generally is not desirable to store the antioxidant composition at temperatures much above about 100° F.

The amount of antioxidant composition to be employed in the organic material to be stabilized will vary over a rather wide range depending upon the particular organic material to be treated. In general the antioxidant composition will be used in an amount of from about 0.0001% to about 1% and more particularly from about 0.001% to about 0.1% of the organic substance.

The following example is introduced to illustrate further the novelty and utility of the present invention but not with the intention of unduly limiting the same.

*Example*

A flaked antioxidant composition comprising approximately 67% by weight of butylated hydroxyanisole, 20% by weight of propyl gallate and 13% by weight of citric acid was prepared as follows: Butylated hydroxyanisole was melted by heating to a temperature of 140° F., and anhydrous propyl gallate powder, in the required amount, was dissolved in the melted butylated hydroxyanisole. The mixture was stirred, and anhydrous citric acid powder, in the required amount, was partly dissolved and partly dispersed therein, and the liquid mixture was further stirred to obtain a substantially homogeneous mixture. The liquid mixture was supplied to a conventional flaking machine, the drum of which was cooled to a temperature of about 50° F. by water circulation through the center thereof. Upon contacting and revolving on the drum, the antioxidant composition was solidified and then was flaked by a blade positioned at the other end of the drum.

Flakes prepared in the above manner were stored at a temperature of 100° F. for 25 days and did not soften or adhere during this storage. The flakes were free flowing and were readily removable from the container by pouring.

We claim as our invention:

1. An antioxidant composition in the form of solid particles, each of said particles comprising from about 50% to about 90% by weight of butylated hydroxyanisole and from about 10% to about 50% by weight of propyl gallate.

2. An antioxidant composition in the form of solid particles, each of said particles comprising from about 50% to about 95% by weight of butylated hydroxyanisole and from about 5% to about 50% by weight of a synergist selected from the group consisting of citric acid, ascorbic acid and esters thereof.

3. An antioxidant composition in the form of flakes, each of said flakes comprising from about 50% to about 90% by weight of butylated hydroxyanisole and from about 10% to about 50% by weight of propyl gallate.

4. An antioxidant composition in the form of flakes, each of said flakes comprising from about 50% to about 95% by weight of butylated hydroxyanisole and from about 5% to about 50% by weight of a synergist selected from the group consisting of citric acid, ascorbic acid and esters thereof.

5. An antioxidant composition in the form of flakes, each of said flakes comprising from about 50% to about 90% by weight of butylated hydroxyanisole, from about 5% to about 25% by weight of propyl gallate and from about 5% to about 25% by weight of citric acid.

6. Solid discrete particles of a mixture of from about 50% to about 90% by weight of butylated hydroxyanisole and from about 10% to about 50% by weight of propyl gallate, each particle containing both components, formed by liquefying a mixture of butylated hydroxyanisole and propyl gallate and emitting droplets thereof into a zone maintained at a temperature below the melting point of said mixture, whereby said droplets solidify into solid particles.

7. Solid discrete particles of a mixture of from about 50% to about 95% by weight of butylated hydroxyanisole and from about 5% to about 50% by weight of citric acid, each particle containing both components, formed by liquefying butylated hydroxyanisole containing citric acid and emitting droplets thereof into a zone maintained at a temperature below the melting point of said mixture, whereby said droplets solidify into solid particles.

8. Solid discrete particles of a mixture of from about 50% to about 90% by weight of butylated hydroxyanisole, from about 5% to about 25% by weight of propyl gallate and from about 5% to about 25% by weight of citric acid, each particle containing all three components, formed by liquefying a mixture of butylated hydroxyanisole and propyl gallate containing citric acid and emitting droplets thereof into a zone maintained at a temperature below the melting point of said mixture, whereby said droplets solidify into solid particles.

References Cited in the file of this patent

UNITED STATES PATENTS

| Number | Name | Date |
|---|---|---|
| 2,511,802 | Hall | June 13, 1950 |

OTHER REFERENCES

Kraybill et al.: Jr. Am. Oil Chem. Soc., September 1949, vol. 26, 5 pages.